United States Patent
Ishikawa et al.

(10) Patent No.: US 8,880,303 B2
(45) Date of Patent: Nov. 4, 2014

(54) VEHICLE CONTROL UNIT AND VEHICLE EQUIPPED WITH THE SAME

(75) Inventors: Naoki Ishikawa, Sagamihara (JP); Katsumi Ueda, Sagamihara (JP); Masanobu Seki, Sagamihara (JP)

(73) Assignee: Mitsubishi Nichiyu Forklift Co., Ltd., Kyoto (JP)

(*) Notice: Subject to any disclaimer, the term of this patent is extended or adjusted under 35 U.S.C. 154(b) by 238 days.

(21) Appl. No.: 12/375,599

(22) PCT Filed: Jul. 15, 2008

(86) PCT No.: PCT/JP2008/063093
§ 371 (c)(1),
(2), (4) Date: Jun. 4, 2010

(87) PCT Pub. No.: WO2009/107255
PCT Pub. Date: Sep. 3, 2009

(65) Prior Publication Data
US 2011/0313627 A1    Dec. 22, 2011

(30) Foreign Application Priority Data
Feb. 26, 2008 (JP) ................... 2008-045268

(51) Int. Cl.
*G06F 7/00* (2006.01)
*G06F 17/00* (2006.01)
(Continued)

(52) U.S. Cl.
CPC ......... *F16H 61/16* (2013.01); *B60W 30/18045* (2013.01); *B60W 10/188* (2013.01); *F16H 2312/09* (2013.01); *B60W 10/06* (2013.01); *F16H 2061/165* (2013.01)
USPC ................ 701/51; 477/15; 477/77

(58) Field of Classification Search
CPC ..... B60W 10/06; B60W 10/02; B60W 10/11; B60W 30/19; F16H 63/502; F16H 61/0437
USPC ........................................ 701/51; 477/15, 77
See application file for complete search history.

(56) References Cited

U.S. PATENT DOCUMENTS 3,913,700 A   10/1975 James
4,768,636 A    9/1988 Ito et al.
(Continued)

FOREIGN PATENT DOCUMENTS

EP    1 744 084 A2    1/2007
(Continued)

OTHER PUBLICATIONS
European Search Report issued May 24, 2011.
(Continued)

*Primary Examiner* — Behrang Badii
*Assistant Examiner* — Daniel L Greene
(74) *Attorney, Agent, or Firm* — Birch, Stewart, Kolasch & Birch, LLP

(57) ABSTRACT

A vehicle control unit and a vehicle equipped with the vehicle control unit are provided, the vehicle control unit being capable of preventing a shift change from being permitted in a direction opposite to a vehicle traveling direction caused by an erroneous operation of a shift lever during a traveling mode. In the vehicle control unit for controlling the vehicle on the basis of a shift range detecting unit configured to detect a shift range selected by a shift operation and a vehicle speed detecting unit configured to detect a vehicle speed, when the shift range detecting unit detects the shift range in a direction opposite to the vehicle traveling direction in a state where the vehicle speed detecting unit detects a vehicle speed not less than a first speed $V_1$, the vehicle control is carried out so that a compulsory deceleration is carried out by means of a deceleration unit provided in the vehicle instead of permitting the shift change corresponding to the shift range, the shift change being desirably permitted when the vehicle speed detecting unit detects that the vehicle speed decreases down to a vehicle speed not more than the first speed $V_1$.

7 Claims, 4 Drawing Sheets

(51) Int. Cl.
  *G06F 19/00* (2011.01)
  *H02P 17/00* (2006.01)
  *B60W 10/00* (2006.01)
  *F16H 61/16* (2006.01)
  *B60W 30/18* (2012.01)
  *B60W 10/188* (2012.01)
  *B60W 10/06* (2006.01)

(56) References Cited

U.S. PATENT DOCUMENTS

| | | | |
|---|---|---|---|
| 6,016,456 A * | 1/2000 | Yu | 701/55 |
| 6,213,914 B1 * | 4/2001 | Sedlmaier et al. | 477/126 |
| 6,459,980 B1 * | 10/2002 | Tabata et al. | 701/70 |
| 2007/0015627 A1 | 1/2007 | Hinami et al. | |

FOREIGN PATENT DOCUMENTS

| | | |
|---|---|---|
| GB | 2 226 092 A | 6/1990 |
| JP | 2-118267 A | 5/1990 |
| JP | 2-136330 A | 5/1990 |
| JP | 4-123939 A | 4/1992 |
| JP | 2877252 B2 | 1/1999 |
| JP | 2000-145952 A | 5/2000 |
| JP | 2000-249220 A | 9/2000 |
| JP | 2006-138424 A | 6/2006 |
| JP | 2007-24136 A | 2/2007 |

OTHER PUBLICATIONS

European Notice of Allowance issued on Feb. 21, 2013 in EP Application No. 08791379.4.
Notice of Allowance dated Jul. 4, 2014 issued in corresponding Chinese Application No. 200880000486.1 with English translation.

* cited by examiner

VEHICLE CONTROL UNIT AND VEHICLE EQUIPPED WITH THE SAME

TECHNICAL FIELD

The present invention relates to a vehicle control unit, having a function of preventing a breakdown of a vehicle caused by an operator's erroneous operation during a vehicle traveling mode, and a vehicle equipped with the vehicle control unit, and more particularly, to a vehicle control unit suitable for an industrial vehicle and a vehicle equipped with the vehicle control unit.

BACKGROUND ART

Generally, in a vehicle, a driving force of an engine is transmitted to a transmission via a torque converter, and is transmitted to a drive wheel via one of a forward clutch and a reverse clutch received in the transmission, thereby allowing the vehicle to be in a traveling mode. The forward clutch and the reverse clutch are selected by a shift lever used to perform a forward/reverse switching operation.

A control system of a general automatic transmission includes a forward solenoid and a reverse solenoid of an electromagnetic switching valve for controlling a drive mechanism involved with a forward/reverse operation of a shift vehicle; and a control device for controlling the forward and reverse solenoids, wherein an operator selects a shift position by operating a shift lever provided in a driver seat, and the solenoids are controlled to be turned on or off on the basis of the shift position of the shift lever detected by a control unit, thereby realizing the speed stages such as a neutral, a forward/reverse, and plural speed stages.

However, in a case where the shift operation is erroneously carried out in a direction opposite to a vehicle traveling direction during a vehicle traveling mode, a transmission, an axle, or the like may be broken down by a high shock generated when a transmission gear is engaged in accordance with the erroneous shift operation. For example, in a case where the shift lever is switched from a forward range to a reverse range by an operator's erroneous operation during a forward traveling mode at a predetermined vehicle speed or more, a large load is applied to the vehicle.

Therefore, Patent Document 1 (Japanese Patent Application Laid-Open No. 2000-249220) discloses an automatic transmission control device which prohibits a switching operation from a forward range to a reverse range in an automatic transmission when a vehicle speed detected by a vehicle speed sensor is not less than a predetermined reverse prohibiting speed and which adopts a vehicle speed using a gear ratio and a turbine rpm obtained from a turbine rpm sensor instead of the vehicle speed when the vehicle speed sensor is in an abnormal state.

Additionally, Patent Document 2 (Japanese Patent Application Laid-Open No. 2006-138424) discloses a configuration in which it is determined whether a vehicle speed deceleration direction is abruptly changed when a shift lever is switched to an R range by an automatic transmission control device and the vehicle speed is faster than a reverse prohibiting speed so as to output a determination that a solenoid is in a reverse prohibiting abnormal state when the vehicle speed deceleration direction is abruptly changed and to output a determination that the solenoid is in a reverse prohibiting normal state when the vehicle speed deceleration direction is not abruptly changed. Accordingly, it is possible to determine an abnormal state by detecting a dangerous state where a gear is not normally engaged at the time of a reverse departure, and thus to improve security and maintainability by informing a passenger of the determination.

As described above, in a case where the gear of the automatic transmission is erroneously selected by the operator in a direction opposite to the vehicle traveling direction during the vehicle traveling mode at a high speed, the transmission, the axle, or the like may be broken down due to a large shock. Particularly, in an industrial vehicle represented as a cargo handling machine such as a forklift or a reach stacker and a construction machine such as a motor grader, a bulldozer, or a wheel loader, the forward/reverse switching operation is frequently repeated since the driving operation is carried out in many cases during a work, and thus an operator's erroneous operation may easily occur. For this reason, a vehicle for preventing the problem has been strongly demanded. Additionally, in the above-described industrial vehicle, since the operator needs to carry out the driving operation during the work, a vehicle has been demanded which is capable of appropriately controlling a vehicle movement without requiring a complex operation as much as possible.

DISCLOSURE OF THE INVENTION

Therefore, the present invention is contrived in consideration of the above-described problems, and an object of the invention is to provide a vehicle control unit and a vehicle equipped with the vehicle control unit, the vehicle control unit being capable of preventing a breakdown of a vehicle by ignoring a shift change in a direction opposite to a vehicle traveling direction caused by an erroneous operation of a shift lever during a traveling mode and of appropriately controlling a vehicle movement without requiring a complex operation as much as possible.

Thus, in order to solve the above-described object, according to a first aspect of the invention, there is provided a vehicle control unit for controlling a vehicle on the basis of a detection signal obtained from a shift range detecting unit configured to detect a shift range selected by a shift operating unit and a vehicle speed detecting unit configured to detect a vehicle speed, wherein when the shift range detecting unit detects the shift range selected in a direction opposite to a vehicle traveling direction in a state where the vehicle speed detecting unit detects a vehicle speed not less than a predetermined speed (first speed) $V_1$, a vehicle control is carried out so that a compulsory deceleration is carried out by means of a deceleration unit provided in the vehicle instead of permitting the shift change corresponding to the detected shift range.

According to the invention, since the shift change is ignored in a direction opposite to a vehicle traveling direction caused by an erroneous operation of the shift lever during a traveling mode, it is possible to prevent a breakdown of a vehicle. That is, in a case where the shift switching operation causing a large load is carried out at a high vehicle speed, it is possible to prevent a high shock from being applied to a transmission, an axle, or the like by carrying out a control for ignoring the shift change of the transmission in accordance with the shift switching operation. Additionally, in a case where the shift switching operation is not carried out in accordance with the operator's intension, since the vehicle traveling direction is not switched by carrying out the compulsory deceleration using the deceleration unit, it is possible to prevent the breakdown of the transmission or the axle. Additionally, it is possible for the operator to find out the erroneous operation of the shift switching operation since the operator feels that the desired acceleration feeling is not obtained even when the operator presses the accelerator pedal. In a case where the shift switching operation is carried out in accordance with the operator's intention, it is possible to allow the vehicle to be in a state where the shift change is smoothly carried out in accordance with the operator's shift operation.

Further, the vehicle control may be carried out so that the compulsory deceleration control using the deceleration unit is continued up to a speed (a second speed $V_2$) at which the vehicle is regarded to be in a substantial stop state.

Likewise, since the compulsory deceleration is carried out by the deceleration unit until the vehicle stops, it is possible to allow the operator to obviously find out that the erroneous operation unintended by the operator has been carried out and to move to a state where the vehicle is operated again in a stable manner. Additionally, in this case, the deceleration unit for performing a hydraulic braking by applying a friction force to the axle or the wheel may be used as the deceleration unit instead of the engine brake. Particularly, a brake system capable of performing a PID control of the brake force may be used as well as a wet-type brake.

Additionally, since there is provided a switch used to change the deceleration, it is possible to change the operator's feeling.

Further, the vehicle control may be carried out so that the shift change in accordance with the shift range detected by the shift range detecting unit is permitted in a case where the second speed $V_2$ not more than the first speed $V_1$ is set in advance, and the vehicle speed detecting unit detects that the vehicle speed decreases down to a vehicle speed not more than the second speed $V_2$.

Likewise, since the shift change of the transmission in accordance with the operator's shift operation is permitted after the vehicle speed decreases down to a vehicle speed not more than the second speed $V_2$ which does not cause a large load to the transmission, the front axle, or the like when the shift change is carried out in a direction opposite to the vehicle traveling direction, it is possible to smoothly carry out the shift change in accordance with the operator's shift operation by reducing a load applied to the vehicle.

Additionally, at this time, when the vehicle speed detecting unit detects that the vehicle speed is not more than the second speed $V_2$, it is desirable to cancel the compulsory deceleration control using the deceleration unit.

Likewise, since the compulsory deceleration is canceled upon permitting the shift change, it is possible to smoothly switch the vehicle traveling direction.

Additionally, since the second speed $V_2$ is set to a value smaller than the first speed $V_1$, and the first speed $V_1$ used as a control condition and the second speed $V_2$ used for canceling the control are set to different values, it is possible to control the vehicle in a stable manner by preventing hunting.

Further, it is desirable that the speeds $V_1$ and $V_2$ are in a slow speed range (for example, a creep speed or so) of several km/h or so (for example, 1 to 5 km/h), and it is desirable that the first speed $V_1$ and the second speed $V_2$ are set to different values in a degree capable of preventing the hunting.

Furthermore, according to the invention, when the shift range detecting unit detects the shift range selected in a direction opposite to the vehicle traveling direction in a state where the vehicle speed detecting unit detects the vehicle speed not less than the first predetermined speed $V_1$, the vehicle control is carried out so that an engine rpm decreases down to a value corresponding to an engine rpm during an idle rotation while allowing a clutch corresponding to the vehicle traveling direction to be in an engagement state. Accordingly, it is possible to easily apply the vehicle control unit to the general vehicle without a new particular component since the engine brake, used as the deceleration unit in the general vehicle, is used as a compulsory deceleration unit. Further, since it is possible to obtain a larger brake force by operating a foot brake if the operator feels necessary, it is possible to carry out the desired operation with a good responsiveness.

Moreover, when the shift range detecting unit detects the shift range selected in a direction opposite to the vehicle traveling direction in a state where the vehicle speed detecting unit detects the vehicle speed not less than the first predetermined speed $V_1$, the vehicle control is carried out so as to allow an engagement of a clutch to be in an open state. Accordingly, it is possible to decrease the vehicle speed by controlling the deceleration unit other than the engine brake. Therefore, it is possible to carry out the prompt deceleration and thus to reduce a time until the shift change as a subsequent step is permitted.

In addition, an alarm unit is desirably provided so as to generate an alarm to an operator or a third person in the vicinity of the vehicle during the compulsory deceleration using the deceleration unit. Accordingly, it is possible for the operator or the third person in the vicinity of the vehicle to accurately check the vehicle state, and thus to promptly carry out the appropriate driving operation.

Further, the vehicle according to the invention is the vehicle equipped with the vehicle control unit. Accordingly, it is possible to provide the vehicle having high durability and reliability without the inconvenience or the breakdown caused by the operator's erroneous operation.

As described above, according to the invention, it is possible to prevent the breakdown of the axle or the transmission by ignoring the shift change in a direction opposite to the vehicle traveling direction caused by the erroneous operation of the shift lever during the traveling mode, and to keep an operator's smooth driving feeling even when the erroneous operation is carried out.

That is, in a case where the shift switching operation causing a large load is carried out at a high vehicle speed, it is possible to prevent a high shock from being applied to the transmission, the front axle, or the like by carrying out a control for ignoring the shift change of the transmission in accordance with the shift switching operation. Additionally, in a case where the shift switching operation is not carried out in accordance with the operator's intension, since the vehicle traveling direction is not switched by carrying out the compulsory deceleration using the deceleration unit, it is possible to prevent the breakdown of the transmission or the axle. Additionally, it is possible for the operator to find out the erroneous operation of the shift switching operation since the operator feels that the desired acceleration feeling is not obtained even when the operator presses the accelerator pedal. In a case where the shift switching operation is carried out in accordance with the operator's intention, it is possible to allow the vehicle to be in a state where the shift change is smoothly carried out in accordance with the operator's shift operation.

Additionally, since the compulsory deceleration is carried out by means of the deceleration unit until the vehicle stops, it is possible to allow the operator to obviously find out that the erroneous operation unintended by the operator has been carried out and to move to a state where the vehicle is operated again in a stable manner.

Further, since the control for permitting the shift change of the transmission in accordance with the operator's shift operation is carried out after vehicle speed of the vehicle decreases down to a vehicle speed not more than a predetermined speed, it is possible to reduce a load applied to the axle or the transmission of the vehicle and caused by the erroneous operation and to provide a satisfactory operation feeling to the operator. In addition, since the compulsory deceleration is canceled upon permitting the shift change, it is possible to smoothly switch the vehicle traveling direction.

Furthermore, since the first speed $V_1$ used as a control condition and the second speed $V_2$ used for canceling the control are set to different values, it is possible to control the vehicle in a stable manner by preventing hunting.

Moreover, since the vehicle control is carried out upon decelerating the vehicle so that the clutch corresponding to the vehicle traveling direction is controlled to be in an engagement state and the engine rpm decreases down to a value corresponding to the rpm of the idle rotation, the engine brake, used as the deceleration unit of the general vehicle, is used as the compulsory deceleration unit. Accordingly, it is possible to easily apply the vehicle control unit to general vehicles without a new particular component.

Further, since the vehicle control is carried out so that the engagement of the clutch is in an open state and the vehicle speed decreases by controlling the deceleration unit other than the engine brake upon decelerating the vehicle, it is possible to carry out the prompt deceleration and thus to reduce a time until the shift change as a subsequent step is permitted.

Furthermore, since the alarm signal is output when the erroneous operation is carried out, it is possible for the operator or the third person in the vicinity of the vehicle to accurately check the vehicle state, and thus to promptly carry out the appropriate driving operation.

BEST MODE FOR CARRYING OUT THE INVENTION

Hereinafter, an exemplary embodiment of the invention will be described in detail with reference to the accompanying drawings. Here, although the dimension, the material, the shape, the relative arrangement, and the like of the component are described in the embodiment, the scope of the invention is not limited thereto so long as a particular description is not made, but those are only examples for a description.

Figure 1:
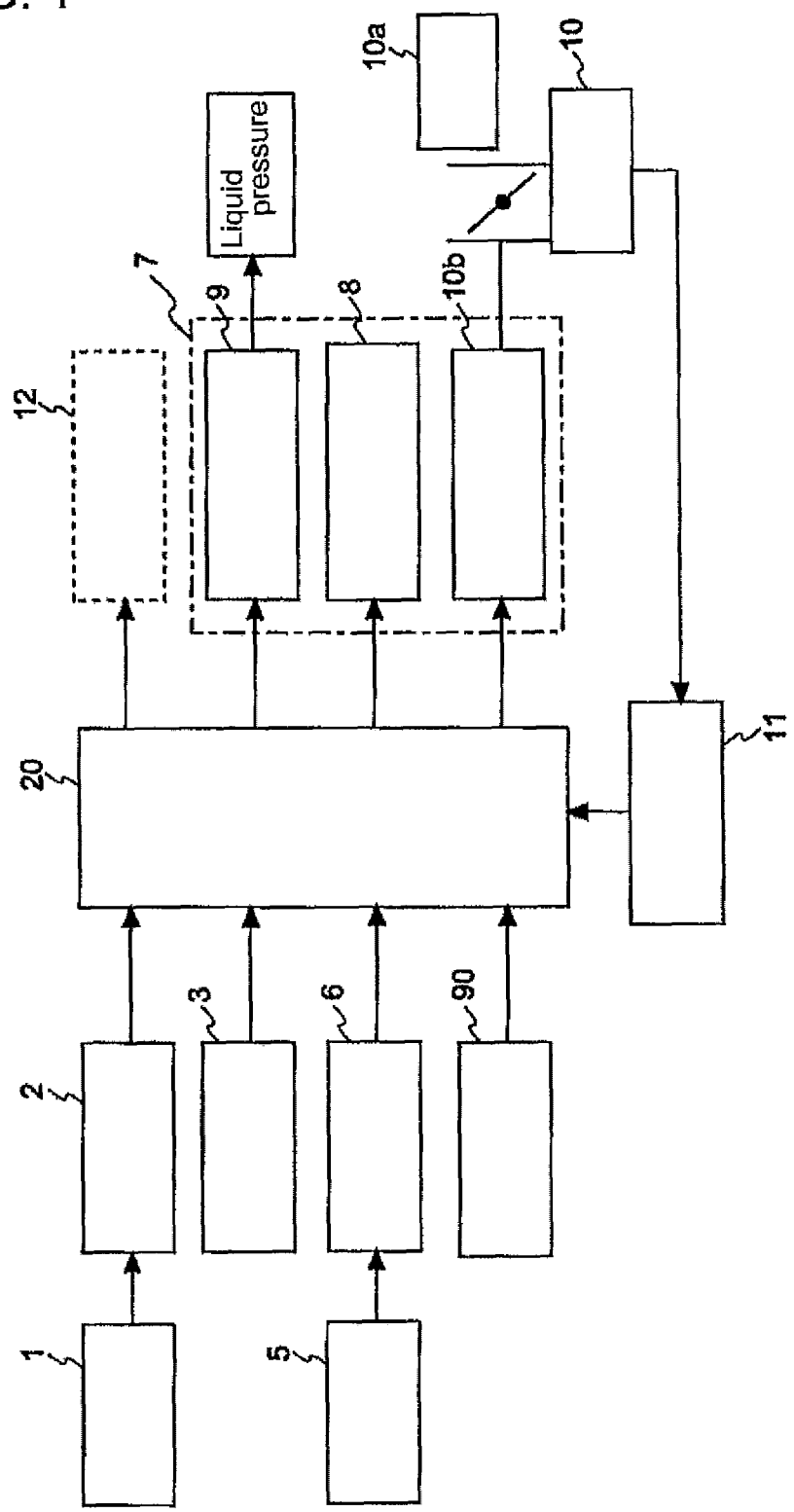
FIG. 1 is a schematic configuration diagram showing a control unit and peripheral units thereof according to an embodiment of the invention.
Figure 2:
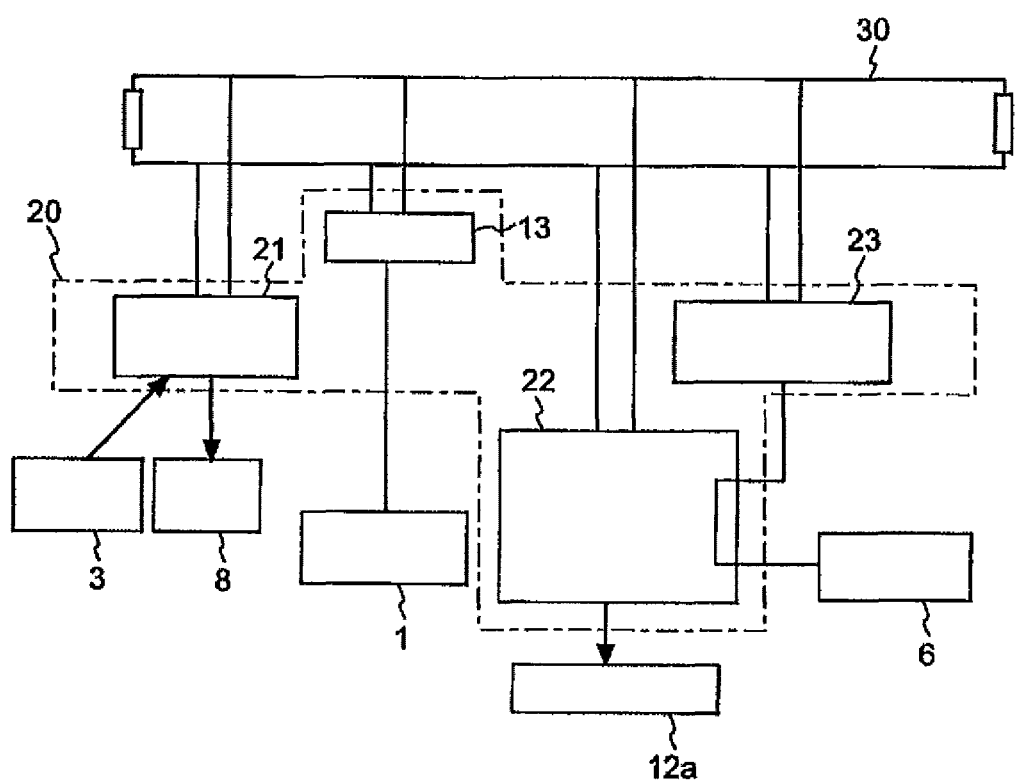
FIG. 2 is a configuration diagram showing an example of a distributed control unit according to the embodiment of the invention.
Figure 3:
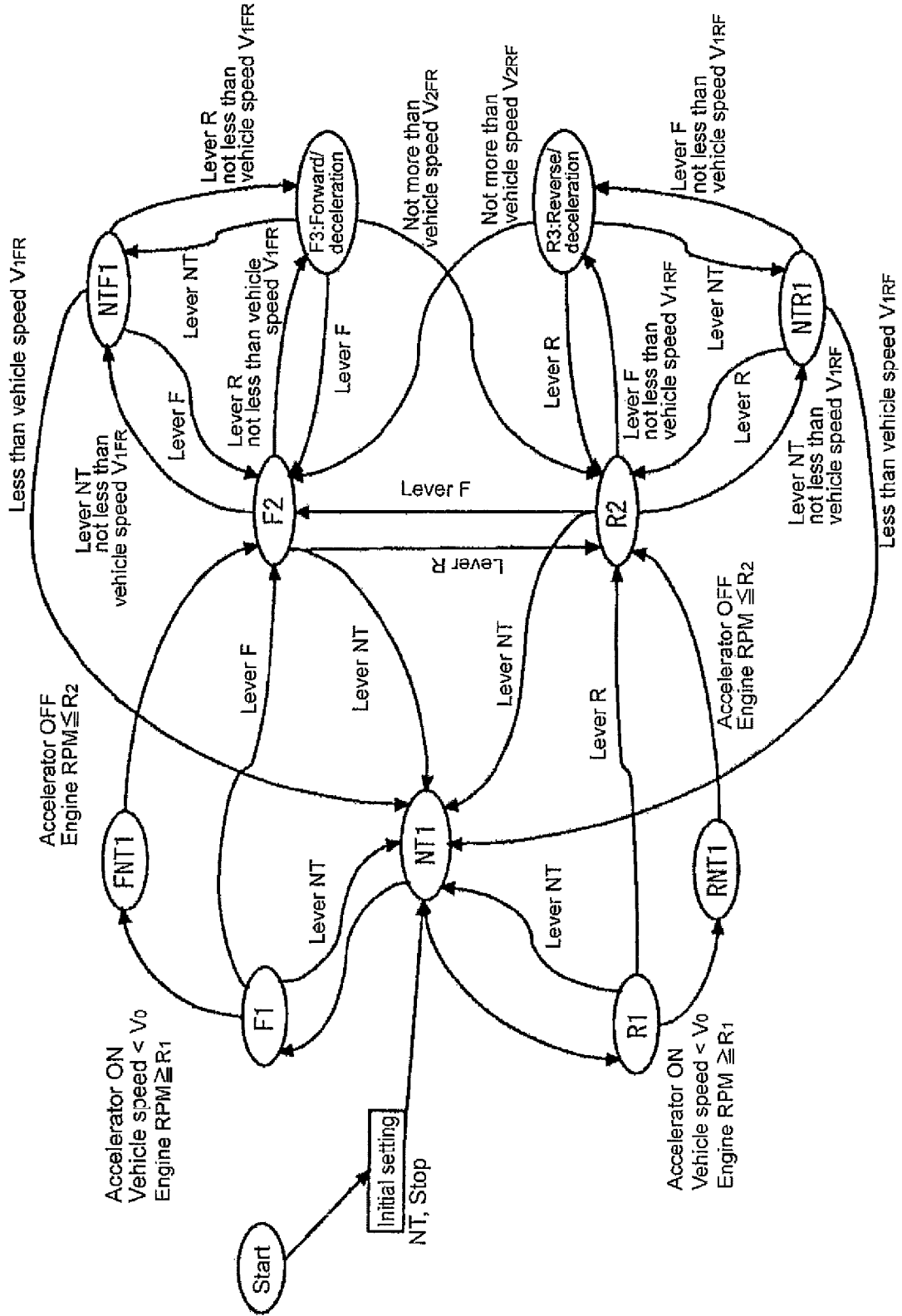
FIG. 3 is a state transition diagram showing an entire operation of a vehicle equipped with the control unit according to the embodiment of the invention.
Figure 4:
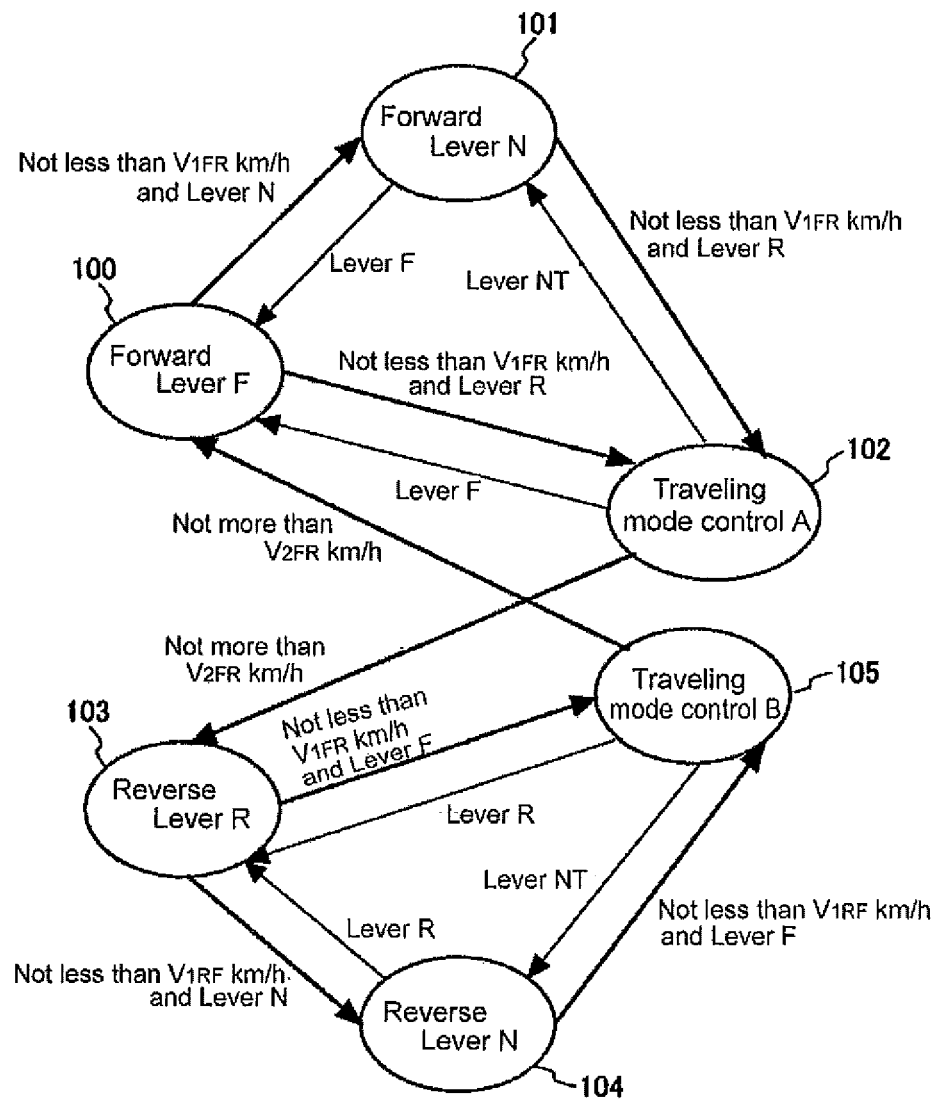
FIG. 4 is a state transition diagram showing a driving control using the control unit according to the embodiment of the invention.

FIG. 1 is a schematic configuration diagram showing a control unit and peripheral units thereof according to an embodiment of the invention. FIG. 2 is a configuration diagram showing an example of a distributed control unit according to the embodiment of the invention. FIG. 3 is a state transition diagram showing an entire operation of a vehicle equipped with the control unit according to the embodiment of the invention. FIG. 4 is a state transition diagram showing a driving control using the control unit according to the embodiment of the invention.

In this embodiment, an automatic transmission realizing a forward one stage and a reverse one stage is shown as an example, but the invention may be applied to an automatic transmission having plural speed stages. The configuration according to this embodiment may be applied to various vehicles as well as a passenger vehicle, and more particularly, to an industrial vehicle represented as a cargo handling machine such as a forklift or a reach stacker and a construction machine such as a motor grader, a bulldozer, or a wheel loader.

By referring to FIG. 1, a schematic configuration of the control unit according to the embodiment will be described. A control unit 20 is configured as a computer including therein a CPU, a RAM, a ROM, and the like. The control unit controls an ON/OFF state of a hydraulic control electromagnetic valve (not shown) by controlling current supplied to a forward/reverse solenoid 8, and controls a shift change of the vehicle by operating a clutch.

Additionally, the control unit 20 is connected to an engine 10, and mainly controls a throttle valve 10a of the engine 10 via a throttle valve operating mechanism 10b on the basis of an input from an accelerator operating unit 5 so as to control an rpm of the engine 10 and to be served as an engine brake. Further, the control unit 20 is connected to a deceleration unit 7 and carries out a predetermined calculation process on the basis of an input signal from a shift range detecting unit 2 and a vehicle speed sensor 3. The control unit supplies a control signal based on the calculation result to the deceleration unit (a brake operating mechanism 9 or the throttle valve operating mechanism 10b) 7 so as to carry out a deceleration control of the vehicle.

The deceleration unit 7 includes the throttle valve operating mechanism 10b for controlling the throttle valve 10a by receiving the control signal from the control unit 20 and the brake operating mechanism 9 for generating a brake hydraulic pressure by receiving the control signal from the control unit 20. It is desirable that the throttle valve operating mechanism 10b is configured as a stepping motor. The brake operating mechanism 9 is a hydraulic generating unit provided in a brake line or a brake master cylinder and generating a hydraulic pressure to operate the brake. For example, it is possible to change a deceleration amount by controlling the hydraulic pressure on the basis of a deceleration switch 90.

Additionally, the control unit 20 is connected to a plurality of sensor groups for detecting various vehicle states, that is, at least the shift range detecting unit 2 for detecting a shift range selected by a shift operating unit 1 disposed in an operator's manipulation portion and the vehicle speed sensor 3 for detecting a vehicle speed. Further, in this embodiment, an engine rpm detecting unit 11 for detecting an rpm of the engine 10 is provided.

Here, the shift operating unit 1 is operated by the operator, and is a unit for setting a desired shift range such as a forward, a reverse, and a neutral, the unit being, for example, a shift lever, a shift switch, or the like. The shift range detecting unit 2 detects a shift range position input by the shift operating unit 1 and outputs a shift range detecting signal to the control unit 20.

An accelerator opening degree detecting unit 6 detects an accelerator pressing amount of the accelerator pedal (an accelerator operating unit) 5 operated by the operator to be output to the control unit 20. The control unit 20 stores information used for obtaining an output value to be output by controlling an opening degree of the throttle valve 10a of the engine via the throttle valve operating mechanism 10b in correspondence to the accelerator pressing amount. On the basis of the stored information, the control unit 20 controls the rpm of the engine 10 by controlling an output supplied to a stepping motor for controlling the throttle valve opening degree of the engine 10 in accordance with a detection signal from the accelerator opening degree detecting unit 6. Additionally, as described above, a feedback control or the like may be carried out in such a manner that the engine rpm detecting unit 11 is provided and the detected rpm is output to the control unit 20.

The deceleration unit 7 has a function of generating a brake force of the vehicle on the basis of the electric control signal from the control unit 20. For example, the throttle valve operating mechanism 10b for controlling the throttle valve 10a by receiving the control signal from the control unit 20, the brake operating mechanism 9 for generating the brake hydraulic pressure by receiving the control signal from the control unit 20, or a combination thereof is used. Among the deceleration unit 7, as the deceleration unit 7 other than the engine brake, a unit having a mechanical-type brake mechanism, an air-type brake mechanism, or a hydraulic-type brake mechanism such as the electromagnetic-control-type hydraulic brake may be used.

The control unit 20 controls the forward/reverse solenoid 8 to carry out a forward/reverse switching operation in a vehicle traveling direction on the basis of the shift range detected by the shift range detecting unit 2. That is, the forward/reverse solenoid 8 is electrically connected to the control unit 20, and current supplied to the forward/reverse solenoid 8 is controlled on the basis of the control signal from the control unit 20, thereby carrying out the forward/reverse switching operation in the vehicle traveling direction.

The power of the engine 10 is transmitted to an automatic transmission via a torque converter. After the forward/reverse switching operation is carried out in the automatic transmission to select the vehicle traveling direction, the power of the engine 10 is transmitted to left and right drive wheels via a differential gear (not shown). The automatic transmission includes a forward clutch and a reverse clutch, and carries out the forward/reverse switching operation in the vehicle traveling direction by applying an operating hydraulic pressure to the clutches via an electromagnetic valve differentially operated by the forward/reverse solenoid 8.

In the control unit 20 having the above-described function, a calculation process for each of the plurality of different controlling portions is carried out. The control unit 20 may be integrally formed or may be separated for each controlling object. An example of the distributed control unit 20 which is separated for each controlling object is shown in FIG. 2.

The control unit 20 includes a vehicle control controller 21, a traveling control controller 22, an engine control controller 23, and a meter panel 13, the controllers being physically distanced from each other and being connected to each other via a communication line 30. Additionally, the shift lever (shift operating unit) 1 is connected to the communication line 30 via the meter panel 13.

The vehicle control controller 21 is connected to the vehicle speed sensor 3, the forward/reverse solenoid 8, and the like, and is a controller for carrying out a basic vehicle control except for an engine control, the controller carrying out, for example, a forward/reverse switching control.

As a characteristic configuration according to this embodiment, the traveling control controller 22 is connected to the accelerator opening degree detecting unit (accelerator opening degree sensor) 6 and the like, and is a controller for carrying out a control for coping with a case where an operator erroneously carries out a shift operation in a direction opposite to the vehicle traveling direction, the controller carrying out, for example, a control for ignoring the shift change or a control for performing a compulsory deceleration.

The engine control controller 23 is connected to the engine 10 (not shown), and is a controller for controlling the engine rpm during a normal traveling mode.

Additionally, it is desirable that the control unit 20 includes an alarm unit 12. The alarm unit 12 is a unit for generating an alarm toward the operator or a third person in the vicinity of the vehicle. For example, in order to promote the deceleration or inform a state where a reverse gear is engaged during a traveling mode at a high speed, a general meter display unit may be provided with an alarm display unit for performing a display, a voice alarm unit for generating an alarm by means of a voice, or an alarm lamp 12a for generating an alarm by turning on a lamp or turning on/off the lamp.

Next, by referring to the state transition diagram shown in FIG. 3, the entire operation of the vehicle equipped with the control unit according to this embodiment will be described. Additionally, the control unit 20 is operated in accordance with a control program storing the following controls in advance.

In FIG. 3, when the operator operates a start key in a vehicle stop state, a start ON state is detected. When the engine is started, the control unit is set in accordance with an initial setting in the vehicle stop state. At this time, the transmission is set to a neutral state (NT1).

When a vehicle speed is less than a predetermined reference speed $V_0$ and the engine rpm is less than a predetermined value $R_1$ (the rpm slightly larger than that of an idle rotation by a range of 5 to 15%) in a state where the operator operates the shift lever (shift operating unit) 1 and the shift range detecting unit 2 detects a state where the shift range is switched from a neutral N to a forward F (F1), a normal shift change is permitted and a forward traveling mode is set (F2).

Meanwhile, when the vehicle speed is equal to a speed in a stop state or the detected vehicle speed is less than the predetermined reference speed $V_0$ (includes a case where $V_0=0$), and the detected rpm of the engine is not less than the predetermined value $R_1$ in a state where the neutral N is switched to the forward F (F1), a prohibiting control for ignoring the shift change corresponding to the switched shift range is carried out (FNT1). At this time, the shift range of the shift lever 1 is located at the forward F, but the transmission is in a neutral state where the gear is not engaged.

Additionally, the reference speed $V_0$ is a value at which the vehicle is regarded to be in a stop state or in a slow speed state such as a creep speed, and may be appropriately set in accordance with a specific configuration of the vehicle.

Further, here, an example is shown in which the engine rpm is directly detected and the control is carried out on the basis of the rpm, but a configuration based on the engine rpm may be provided as another method. For example, a configuration may be provided in which a control is carried out on the basis of the accelerator opening degree detected by the accelerator opening degree detecting unit 6. Likewise, when the detection value indicates a movement in accordance with the engine rpm, the engine rpm may be indirectly detected for use. When the accelerator opening degree is involved with the engine rpm, the same control as the above-described control may be carried out. That is, when the accelerator opening degree detected by the accelerator opening degree detecting unit 6 is not less than a predetermined value $P_1$ in a state where the predetermined value $P_1$ of the accelerator opening degree corresponding to the engine rpm $R_1$ is set in advance, the prohibiting control for prohibiting the shift change is carried out (FNT1).

When it is detected that the engine rpm is not more than a predetermined value $R_2$ after carrying out the switching prohibiting control (FNT1), a control for canceling the prohibiting control is carried out. The canceling control is a control for carrying out the shift change of the transmission in accordance with the shift operation of the shift lever 1, thereby setting a normal forward traveling mode (F2).

When the shift range is switched from the neutral N to the reverse R after the starting operation (R1), the subsequent control is carried out in a manner opposite to the forward F.

Subsequently, when the vehicle speed is not less than a first speed $V_{1FR}$ as a predetermined shift change prohibiting control starting speed (the reverse traveling mode during the forward traveling mode) and the shift operation is carried out from the forward F to the reverse R in a state where the vehicle travels in the forward traveling mode (F2), the control unit 20 carries out a control for ignoring the shift change to the reverse R, and a deceleration traveling control is carried out by the deceleration unit 7 (F3).

When it is detected that the vehicle speed is not more than a second speed $V_{2FR}$ as a predetermined shift change prohibiting control canceling speed (the reverse traveling mode during the forward traveling mode) after carrying out the traveling mode control (F3), the shift change to the reverse R is permitted, thereby carrying out a normal reverse traveling mode (R2).

Additionally, when the vehicle speed is not less than the predetermined shift change prohibiting control starting speed (the reverse traveling mode during the forward traveling mode) $V_{1FR}$ and the shift operation is carried out from the forward F to the neutral N in a state where the vehicle travels in the normal forward traveling mode (F2), the transmission is in the neutral state (NTF1). Further, when the vehicle speed is not less than the predetermined shift change prohibiting control starting speed (the reverse traveling mode during the forward traveling mode) $V_{1FR}$ in a state where the shift operation is carried out to the reverse R in this state, the above-described traveling mode control (F3) is carried out. When it is detected that the vehicle speed is not more than the predetermined shift change prohibiting control canceling speed (the reverse traveling mode during the forward traveling mode) $V_{2FR}$ after carrying out the above-described traveling mode control (F3), the shift change to the reverse R is permitted, thereby carrying out the normal reverse traveling mode (R2).

Further, when the shift lever is returned to the forward F in a state where the above-described traveling mode control (F3) is carried out, the normal forward traveling mode (F2) is carried out.

Furthermore, the shift change prohibiting control starting speed (the reverse traveling mode during the forward traveling mode) $V_{1FR}$ and the shift change prohibiting control canceling speed (the reverse traveling mode during the forward traveling mode) $V_{2FR}$ may be set to the same value, but it is desirable to set $V_{1FR} > V_{2FR}$ from the view point of stably controlling the vehicle by restricting hunting.

In the same manner, when the vehicle speed is not less than the predetermined shift change prohibiting starting speed (the forward traveling mode during the reverse traveling mode) as the predetermined speed $V_{1RF}$ and the shift operation is carried out from the reverse R to the forward F in a state where the vehicle travels in the normal reverse traveling mode (R2), the shift change to the forward F is not determined by the control unit 20, and the deceleration traveling mode control is carried out by the deceleration unit 7 (R3).

When it is detected that the vehicle speed is not more than the predetermined shift change prohibiting control canceling speed (the forward traveling mode during the reverse traveling mode) as the predetermined speed $V_{2RF}$ after carrying out the above-described traveling mode control (R3), the shift change to the forward F is permitted, thereby carrying out the normal forward traveling mode (F2).

Additionally, when the vehicle speed is not less than the predetermined shift change prohibiting control starting speed (the forward traveling mode during the reverse traveling mode) $V_{1RF}$ and the shift operation is carried out to the neutral N in a state where the vehicle travels in the normal reverse traveling mode (R2), the neutral state (NTR1) is permitted. When the vehicle speed is not less than the shift change prohibiting control starting speed (the forward traveling mode during the reverse traveling mode) $V_{1RF}$ in a state where the shift lever 1 is switched to the forward F, the above-described traveling mode control (R3) is carried out. When it is detected that the vehicle speed is not more than the predetermined shift change prohibiting control canceling speed (the forward traveling mode during the reverse traveling mode) $V_{2RF}$ after carrying out the above-described traveling mode control (R3), the shift change to the forward F is permitted, thereby carrying out the normal forward traveling mode (F2).

Further, when it is detected that the shift lever 1 is returned to the reverse R in a state where the above-described traveling mode control (R3) is carried out, the normal reverse traveling mode (R2) is carried out.

Furthermore, the shift change prohibiting control starting speed (the reverse traveling mode during the forward traveling mode) $V_{1FR}$ and the shift change prohibiting control starting speed (the forward traveling mode during the reverse traveling mode) $V_{1RF}$ may be set to the same value or different values. In the same manner, the shift change prohibiting control canceling speed (the reverse traveling mode during the forward traveling mode) $V_{2FR}$ and the shift change prohibiting control canceling speed (the forward traveling mode during the reverse traveling mode) $V_{2RF}$ may be set to the same value or different values.

Moreover, although it is not shown in the drawing, when the traveling mode control F3 or R3 is carried out, instead of the shift change, the compulsory deceleration may be carried out until the vehicle stops and the vehicle speed is not more than the shift change prohibiting control canceling speed $V_2$ ($V_{2FR}$ in a case of the reverse traveling mode during the forward traveling mode or $V_{2RF}$ in a case of the forward traveling mode during the reverse traveling mode).

The above-described $V_{1FR}$, $V_{1RF}$, $V_{2FR}$, and $V_{2RF}$ may be arbitrarily set in accordance with the specific configuration of the vehicle without departing from the spirit of the invention.

Here, as a characteristic configuration according to this embodiment, a forward/reverse switching operation in the traveling mode during the above-described operation will be described in detail with reference to FIG. 4.

In FIG. 4, when the vehicle speed sensor 3 detects that the vehicle speed is not less than the predetermined shift change prohibiting control starting speed (the reverse traveling mode during the forward traveling mode) $V_{1FR}$ and the shift range detecting unit 2 detects that the shift lever 1 is switched from the forward F to the neutral N in a state where the shift lever 1 is switched to the forward F and the vehicle travels in the forward traveling mode (100), the shift change of the transmission is carried out to the neutral in the same manner as the normal control (101).

On the other hand, when the vehicle speed sensor 3 detects that the vehicle speed is not less than the predetermined shift change prohibiting control starting speed (the reverse traveling mode during the forward traveling mode) $V_{1FR}$ and the shift range detecting unit 2 detects that the shift lever 1 is switched from the forward F to the reverse R, in this embodiment, a traveling mode control A is carried out by the control unit 20 (102). In the traveling mode control A, the control unit 20 carries out a control for ignoring the shift change to the reverse R and a control for decreasing the vehicle speed by means of the engine brake. That is, in terms of the control signal of the control unit 20, the switching operation of the forward/reverse solenoid 8 corresponding to the shift operation is not carried out. However, the forward solenoid corresponding to the vehicle traveling direction is maintained to be in an ON state (the reverse solenoid is maintained to be in an OFF state), and the opening degree of the throttle valve 10a is narrowed to compulsorily decrease the engine rpm and to operate the engine brake. It is desirable that the engine rpm decreases down to a value corresponding to the rpm of the idle rotation.

At this time, the accelerator input by the operator may be cancelled. For example, the control unit 20 is allowed not to send an output to a proportional valve of the throttle vale of the engine 10 regardless of the operator's accelerator operation. Additionally, in a case where the accelerator pedal is connected to the engine by means of a mechanical linkage mechanism, the linkage mechanism may be configured to be temporarily disconnected during the traveling mode control. This is carried out so as to prevent a case in which the brake force using the deceleration unit 7 is canceled by an acceleration force using the accelerator pedal.

In this state, the shift lever 1 is located at the reverse R, but the transmission is located at the forward F. At this time, the forward traveling mode is carried out, and the vehicle speed gradually decreases in terms of the operation of the engine brake.

Additionally, it is desirable to generate an alarm to the operator or the third person in the vicinity of the vehicle by means of the alarm unit 12 during the traveling mode control A. The alarm unit 12 informs the operator or the third person that the departure control is currently carried out or informs the operator of the subsequent operation to be carried out.

Further, when the vehicle speed sensor 3 detects that the vehicle speed is not more than the shift change prohibiting control canceling speed (the reverse traveling mode during the forward traveling mode) $V_{2FR}$ during the traveling mode control A, the shift change of the transmission in accordance with the shift operation using the shift lever 1 is controlled to be permitted. That is, when the detected vehicle speed is not more than the shift change prohibiting control canceling speed (the reverse traveling mode during the forward traveling mode) $V_{2FR}$, the forward solenoid is made to be in an OFF state and the reverse solenoid is made to be in an ON state in correspondence to the reverse R detected by the shift range detecting unit 2, thereby carrying out the reverse traveling mode. At this time, the alarm generated by the alarm unit 12 is canceled.

Furthermore, when the vehicle speed sensor 3 detects that the vehicle speed is not less than the predetermined shift change prohibiting control stating speed (the reverse traveling mode during the forward traveling mode) $V_{1FR}$ and the shift range detecting unit 2 detects that the shift lever 1 is switched from the neutral N to the reverse R in a state where the vehicle is in the neutral state (101), the traveling mode control A is carried out in the same manner as the above-described control (102). In a case where the traveling mode control A is carried out in the neutral state (101), current is supplied to the forward solenoid in order to operate the forward clutch corresponding to the vehicle traveling direction. At the same time, when the vehicle speed is not more than the shift change prohibiting control canceling speed (the reverse traveling mode during the forward traveling mode) $V_{2FR}$, the shift change of the transmission in accordance with the shift operation using the shift lever 1 is controlled to be permitted.

In the same manner, when the vehicle speed sensor 3 detects that the vehicle speed is not less than the predetermined shift change prohibiting control starting speed (the forward traveling mode during the reverse traveling mode) $V_{1RF}$, and the shift lever 1 is switched from the reverse R to the neutral N in a state where the shift lever 1 is switched to the reverse R and the vehicle travels in the reverse traveling mode (103), the shift change of the transmission is carried out to the neutral in the same manner as the normal control (104).

Meanwhile, when the vehicle speed is not less than the shift change prohibiting control starting speed (the forward traveling mode during the reverse traveling mode) $V_{1RF}$, and the shift lever 1 is switched from the reverse R to the forward F, in this embodiment, a traveling mode control B is carried out (105). In the traveling mode control B, the control unit 20 carries out a control for ignoring the shift change to the forward F and a control for decreasing the engine rpm (vehicle speed) by means of the deceleration unit 7. That is, in terms of the control signal of the control unit 20, the reverse solenoid is maintained to be in an ON state (the forward solenoid is maintained to be in an OFF state). At the same time, the control unit 20 outputs a control signal for operating the deceleration unit 7, thereby compulsorily decreasing the vehicle speed.

At this time, in the same manner as the forward traveling mode, it is desirable that the alarm unit 12 generates an alarm towards the operator or the third person in the vicinity of the vehicle.

When the vehicle speed is not more than the shift change prohibiting control canceling speed (the forward traveling mode during the reverse traveling mode) $V_{2RF}$ during the traveling mode control B, the shift change in accordance with the shift operation using the shift lever 1 is controlled to be permitted. In this case, in correspondence to the forward F detected by the shift range detecting unit 2, the forward/reverse solenoid 8 is switched, the reverse solenoid is made to be in an OFF state, and then the forward solenoid is made to be in an ON state, thereby carrying out the forward traveling mode. At this time, the alarm unit 12 is canceled.

Additionally, when the vehicle speed detected by the vehicle speed sensor 3 is not less than the predetermined shift change prohibiting control starting speed (the forward traveling mode during the reverse traveling mode) $V_{1RF}$ and the shift lever 1 is switched from the neutral N to the forward F in a state where the vehicle is in the above-described neutral state (104), the traveling mode control B is carried out in the same manner as the above-described control (105). Even in a case where the traveling mode control B is carried out in the neutral state (104), in the same manner as described above, when the vehicle speed is not more than the shift change prohibiting control canceling speed (the forward traveling mode during the reverse traveling mode) $V_{2RF}$, the shift change of the transmission in accordance with the shift operation using the shift lever 1 is controlled to be permitted.

Further, in this embodiment, a case has been described in which the engine brake is used as the deceleration unit, but the invention may adopt a braking unit capable of controlling a brake force on the basis of an electrical signal from the control unit 20 or may adopt an engine brake, an electromagnetic-control-type hydraulic brake, or the combination thereof.

In a case where the compulsory deceleration is carried out by means of the electromagnetic-control-type brake as the deceleration unit 7, the control unit 20 outputs a predetermined control signal, set in advance with respect to the brake solenoid, to the brake solenoid. By operating the electromagnetic valve in accordance with the control signal, it is possible to generate a desired brake force. At this time, the control unit stores a data table involved with the brake force, and the brake force may be arbitrarily set. In a normal driving state other than the compulsory deceleration state, the control signal in accordance with an operator's brake operation amount is output to the brake solenoid.

Additionally, in the compulsory deceleration, when the brake force corresponding to the operator's brake operation amount is larger than the brake force corresponding to the compulsory deceleration control of the control unit 20, it is desirable that the control unit 20 carries out a control so as to first generate the brake force in accordance with the operator's brake operation.

In a case where the above-described compulsory deceleration is carried out by means of only the engine brake or the engine brake and the electromagnetic-control-type brake, it is necessary to carry out the clutch engagement in the vehicle traveling direction and to reduce the engine rpm due to the principle of the engine brake. On the other hand, in a case where only the electromagnetic-control-type brake is used, it is not necessary to carry out the operation all the time. For example, the control unit 20 may output a control signal to the forward/reverse solenoid 8 so as to allow the clutch to be in an open (neutral) state, and may output a control signal to the brake solenoid so as to obtain a predetermined brake force. Accordingly, it is possible to prevent a brake force offset caused by the operator's accelerator operation and thus to efficiently carry out a deceleration.

Additionally, in a case where the electromagnetic-control-type brake is used (the engine brake may be used together), the compulsory control may be continued until the vehicle stops upon carrying out the compulsory deceleration control. Accordingly, since it is possible to inform the operator of the erroneous operation, it is possible to move to a state where the vehicle is operated again in a stable manner.

Likewise, according to this embodiment, when it is detected that the shift operation is carried out in a direction opposite to the vehicle traveling direction in a state where the vehicle speed is high, it is possible to prevent the breakdown of the vehicle by ignoring the shift change corresponding to the shift operation, and to keep an operator's smooth driving feeling even when the erroneous operation is carried out.

That is, in a case where the shift switching operation causing a large load is carried out at a high vehicle speed, it is possible to prevent a high shock from being applied to the transmission or the front axle by carrying out a control for ignoring the shift change of the transmission in accordance with the shift switching operation. Additionally, at this time, in a case where the shift switching operation is not carried out in accordance with the operator's intention, the vehicle traveling direction is not switched by carrying out the compulsory deceleration of the deceleration unit 7. Additionally, it is possible for the operator to detect the erroneous operation of the shift switching operation since the operator feels that the desired acceleration feeling is not obtained even when the operator presses the accelerator pedal (accelerator operating unit) 5. In a case where the shift switching operation is carried out in accordance with the operator's intention, it is possible to allow the vehicle to be in a state where the shift change is smoothly carried out in accordance with the operator's shift operation.

Additionally, since the compulsory deceleration is carried out by means of the deceleration unit 7 until the vehicle stops, it is possible to allow the operator to obviously find out that the erroneous operation unintended by the operator has been carried out and to move to a state where the vehicle is operated again in a stable manner.

Further, since the control for permitting the shift change of the transmission in accordance with the operator's shift operation is carried out after vehicle speed of the vehicle decreases down to a vehicle speed not more than a predetermined speed, it is possible to reduce a load applied to the vehicle and caused by the erroneous operation and to provide a satisfactory operation feeling to the operator. In addition, since the compulsory deceleration is canceled upon permitting the shift change, it is possible to smoothly switch the vehicle traveling direction.

Furthermore, since the first speed $V_1$ as a control condition and the second speed $V_2$ for canceling the control are set to different values, it is possible to control the vehicle in a stable manner by preventing hunting.

Moreover, since the vehicle control is carried out upon decelerating the vehicle so that the clutch corresponding to the vehicle traveling direction is controlled to be in an engagement state and the engine rpm decreases down to a value corresponding to the rpm of the idle rotation, the engine brake, used as the deceleration unit of the general vehicle, is used as the compulsory deceleration unit. Accordingly, it is possible to easily apply the vehicle control unit to the general vehicles without a new particular component.

Further, since the vehicle control is carried out so that the engagement of the clutch is in an open state and the vehicle speed decreases by controlling the deceleration unit other than the engine brake upon decelerating the vehicle, it is possible to carry out the prompt deceleration and thus to reduce a time until the shift change as a subsequent step is permitted.

Furthermore, since the alarm signal is output when the erroneous operation is carried out, it is possible for the operator or the third person in the vicinity of the vehicle to accurately check the vehicle state, and thus to promptly carry out the appropriate driving operation.

INDUSTRIAL APPLICABILITY

According to this embodiment, since it is possible to reduce a risk inducing the breakdown of the vehicle caused by the operator's erroneous operation during the vehicle traveling mode at a high speed, the invention is applicable to various vehicles including the passenger vehicle, and more particularly, to the whole cargo handling industrial vehicle such as the forklift in which the forward/reverse switching operation is frequently carried out.

The invention claimed is:

1. A vehicle control unit for controlling a vehicle speed and a forward/reverse switching operation on the basis of a detection signal obtained from a shift range detecting unit configured to detect a shift range selected by a shift operating unit and a vehicle speed detecting unit configured to detect the vehicle speed or an engine rpm, wherein when the shift range detecting unit detects the shift range in a direction opposite to a vehicle traveling direction in a state where the vehicle speed detecting unit detects a vehicle speed not less than a first predetermined speed $V_1$, a vehicle control is carried out so that a compulsory deceleration is carried out by a deceleration unit provided in the vehicle instead of permitting the shift change corresponding to the detected shift range, and the shift change in accordance with the shift range is permitted after the vehicle speed detecting unit detects that the vehicle speed decreases down to a second speed $V_2$ not more than the first speed $V_1$, wherein said deceleration unit includes:

a throttle valve operating mechanism which narrows an opening degree of a throttle valve of the engine while allowing a clutch corresponding to the vehicle traveling direction to be in an engagement state; and a brake operating mechanism having an electromagnetic-control type hydraulic brake which is capable of generating a desired brake force; and wherein the vehicle control unit further comprises:

a brake force judging unit for first generating a brake force in accordance with an operation amount of an operator's brake operation when a brake force corresponding to the operation amount of the operator's brake operation is larger than a brake force corresponding to a compulsory deceleration control of the control unit during the compulsory deceleration carried out by said deceleration unit; and a switch which allows an operator to change a deceleration amount of the vehicle caused by the compulsory deceleration, by controlling a hydraulic pressure.

2. A vehicle equipped with the vehicle control unit according to claim 1.

3. The vehicle control unit according to claim 1, wherein an alarm unit is provided so as to generate an alarm to an operator or a third person in the vicinity of the vehicle during the compulsory deceleration using the deceleration unit.

4. A vehicle equipped with the vehicle control unit according to claim 3.

5. The vehicle control unit according to claim 1, wherein the second speed $V_2$ is a speed at which the vehicle is regarded to be in a substantial stop state.

6. A vehicle equipped with the vehicle control unit according to claim 5.

7. The vehicle control unit according to claim 5, wherein when the vehicle speed detecting unit detects that the vehicle speed decreases down to a vehicle speed not more than the second speed V2, the compulsory deceleration control using the deceleration unit is canceled.

* * * * *